May 2, 1967  W. R. EDWARDS  3,317,500
HYDROCARBON-INSOLUBLE POLY-4-METHYL-1-PENTENE
Filed Oct. 2, 1963  2 Sheets-Sheet 1

INVENTOR.
WILLIAM R. EDWARDS,
BY
ATTORNEY.

May 2, 1967

W. R. EDWARDS 3,317,500

HYDROCARBON-INSOLUBLE POLY-4-METHYL-1-PENTENE

Filed Oct. 2, 1963

2 Sheets-Sheet 2

INVENTOR.
WILLIAM R. EDWARDS,
BY

ATTORNEY.

United States Patent Office 3,317,500
Patented May 2, 1967

3,317,500
HYDROCARBON-INSOLUBLE POLY-4-METHYL-1-PENTENE
William R. Edwards, Baytown, Tex., assignor, by mesne assignments, to Esso Research and Engineering Company, Elizabeth N.J., a corporation of Delaware
Filed Oct. 2, 1963, Ser. No. 313,286
30 Claims. (Cl. 260—93.7)

The present invention is directed to a hydrocarbon-insoluble elastomer produced from 4-methyl-1-pentene and a method of making it. More specifically, the present invention relates to the production of a hydrocarbon-insoluble elastomer by polymerization of 4-methyl-1-pentene in a methyl halide solvent in the presence of a catalyst chosen from the group consisting of solid aluminum chloride and monoethyl aluminum chloride at a temperature above −20° F.

It has been found that 4-methyl-1-pentene can be polymerized in one of two manners: so-called 1,2-polymerization or the so-called 1,4-polymerization. These repeating groups are shown below.

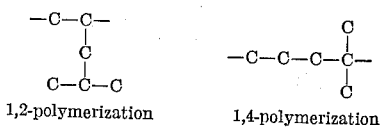

1,2-polymerization      1,4-polymerization

A poly-4-methyl-1-pentene may exhibit both types of repeating units in it in the same chain. It has been found that with the aluminum chloride catalyst, lower temperatures favor 1,4-polymerization so that at less than −20° F., only a relatively small number of 1,2-repeating groups will be found in poly-4-methyl-1-pentene. At the lower temperatures, the polymer product is soluble in hydrocarbons. At temperatures above −20° F., a hydrocarbon-insoluble polymer is formed along with a small amount of soluble polymer. At temperatures above −20° F., the ethyl aluminum chloride also produces a certain amount of the insoluble poly-4-methyl-1-pentene.

Figure 1:
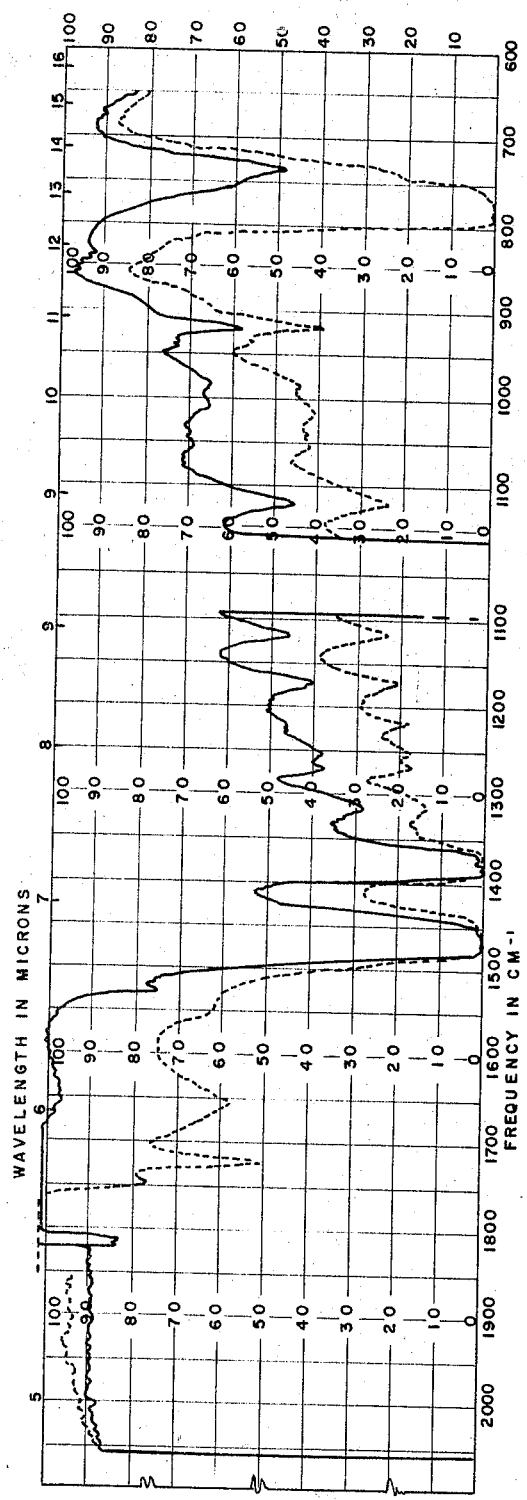
Figure 2:
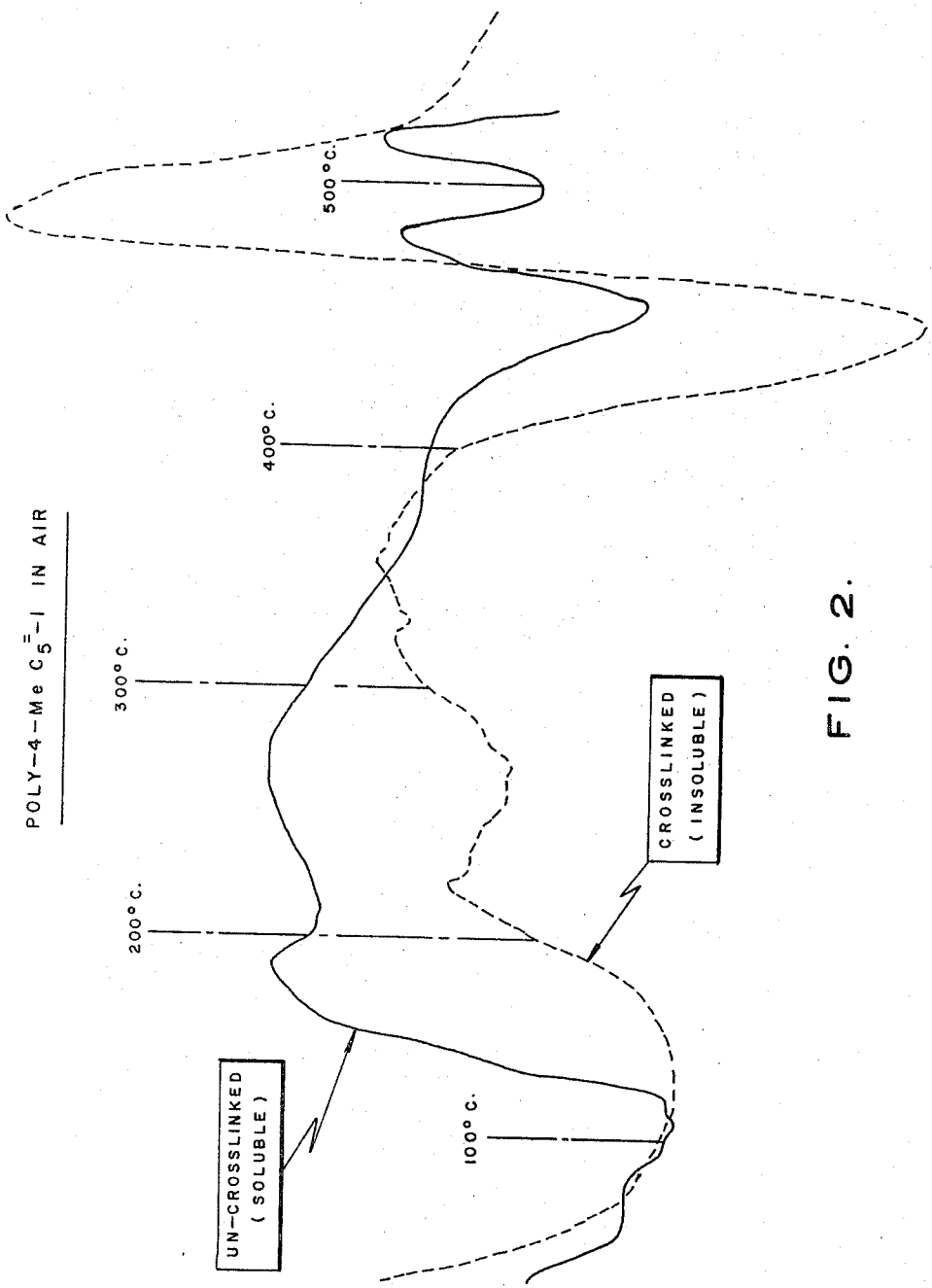

The hydrocarbon-insoluble polymer is elastomeric, and apparently results from cross-linking of the 1,4-repeating units in the polymer chains. This elastomeric polymer has a specific gravity of about 0.9, exhibits no cold flow properties, and is insoluble in hydrocarbons. The infrared (IR) analysis of the insoluble polymer is similar to that of the soluble polymer, as seen in FIG. 1. However, the differential thermal analysis (DTA) is distinctive, as shown in FIG. 2. The DTA for both the soluble and insoluble poly-4-methyl-1-pentene was obtained when using air as a standard. This hydrocarbon-insoluble elastomer has numerous uses; for example, it may be used as a packing for molecular weight separation in chromatographic columns, or may be blended with polypropylene to produce a modified plastic product. It may also be used as gasket material in sealing pipe connections wherein a hydrocarbon stream is flowing under moderate temperatures and pressures.

Turning now to the process of producing the novel elastomer, it has been found that the cross-linked poly-4-methyl-1-pentene can be obtained only under certain conditions:

(1) The catalyst used for polymerization must be either solid aluminum chloride or ethyl aluminum chloride;
(2) Methyl halide solvents must be used;
(3) The temperature must be greater than about −20° F.; and
(4) Competing hydrocarbons (i.e., hydrocarbons other than 4-methyl-1-pentene) having tertiary carbon atoms must be substantially absent from the reaction zone.

These criteria will be discussed below.

CATALYSTS

The cross-linked polymer is best produced with monoethyl aluminum chloride or with solid aluminum chloride catalyst. It is necessary that the aluminum chloride catalyst be present as a solid, or the cross-linked polymer is not produced. The provision of solid aluminum chloride in the reaction zone may be accomplished in various ways. First, the catalyst may be introduced into the reaction zone as a finely divided solid, for example, as a powder having a particle size of less than 200-mesh. Second, a saturated solution of aluminum chloride in the methyl halides solvent may be prepared under pressure and introduced into the reaction zone at the boiling point of the solvent, flashing off the solvent and leaving the catalyst in the form of finely divided particles. Third, a saturated solution of catalyst in methyl halide can be injected into the monomer feed stream, and the countersolvent effect will precipitate the catalyst as a finely divided solid. Variance of these methods may be used, or other ways may be devised for accomplishing the same result. The catalyst concentration of 0.00001 to 0.01 pound per pound of monomer is suitable, both with respect to the solid aluminum chloride catalyst and the alternative monoethyl aluminum chloride which may be used.

TEMPERATURE AND PRESSURE

The reaction can be accomplished at a temperature within the range of −20° F. to +100° F., and at subatmospheric, atmospheric, or superatmospheric pressures. A preferred temperature is the boiling point of the methyl halides solvent at the pressure employed, so that autorefrigeration can be employed to control the temperature of this highly exothermic reaction.

For methyl chloride at atmospheric pressure, the preferred temperature would be −10° F. Pressure variations have no significant effect on the reaction since it is accomplished in the liquid phase, it being necessary only to provide sufficient pressure to maintain the reactants in the liquid phase under the reaction conditions. Atmospheric pressure is preferred for simplicity of operations.

TERTIARY CARBON COMPOUNDS

Other than the monomer, hydrocarbons having tertiary carbon atoms must be rigorously excluded from the reaction zone. As little as 2% isobutane in the methyl chloride solvent has been found to shift the reaction entirely to the production of a soluble polymer. Similar results have been experienced with 5% isobutylene in the methyl chloride and with 13% 3-methyl-1-butene in the methyl chloride. It is thought that the tertiary carbon-containing compounds compete with the 1,2-units of 4-methyl-1-pentene as hydride abstracters, thereby reducing cross-linking.

Figure 1A:
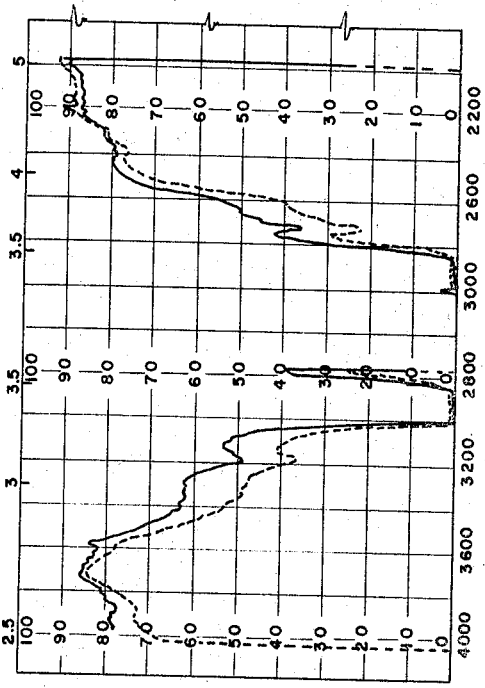

No other monoolefin has been found to have the capability of forming a self-cross-lined polymer. The next adjacent homologs, 3-methyl-1-butene and 5-methyl-1-hexene, have been investigated, but have not yielded a cross-linked polymer even though treated in the same manner as 4-methyl-1-pentene. It, thus, appears that, for reasons not yet known, 4-methyl-1-pentene is unique in this regard. This unique hydrocarbon, therefore, forms the sole feedstock for the present invention. Properties of the cross-linked 1,4-poly-4-methyl-1-pentene include an infrared absorbance spectrum, as shown in FIGS. 1 and 1A, and a differential thermal analysis as shown in FIG. 2. In FIGS. 1 and 1A, the cross-linked polymer (solid line) is seen to have almost the same absorbances as noncross-linked 1,4-poly-4-methyl-1-pentene. Differences are ascribed to the presence of solvent in the noncross-linked sample. The DTA of FIG. 2 was obtained when using air as a standard.

TABLE I.—CATALYSTS—CONDITIONS

| Example | Catalyst | Polymer Type | Molecular Weight |
|---|---|---|---|
| I | $AlCl_3$, solid | Insoluble | >1,000,000. |
| II | $AlCl_3$, in solution | Soluble | 75,000. |
| III | $EtAlCl_2$, in solution | Soluble/insoluble | Soluble, 200,000–250,000. |
| IV | $DiEtAlCl$, in solution | No polymer | |

In order to show the criticality of the above-discussed variables, a number of runs were made and are considered below as the various examples.

The first set of runs was made to show that the aluminum chloride must be used in solid form, and that monoethyl aluminum chloride is suitable for producing small amounts of insoluble polymer.

Example I

To 50 cc. of refluxing methyl chloride at atmospheric pressure was added 0.15 g. of solid aluminum chloride powder. Immediately thereafter were added 10 cc. of 4-methyl-1-pentene. A vigorous polymerization occurred instantaneously, yielding 100% poly-4-methyl-1-pentene based on the monomer charged. The polymer was exclusively insoluble in hydrocarbon. No soluble polymer was formed. The temperature of the reaction was −10° F.

Example II

A solution was prepared which contained 0.5 weight percent $AlCl_3$ in methyl chloride. Thirty cc. of this solution were added to a refluxing mixture of 20 cc. of methyl chloride and 10 cc. of 4-methyl-1-pentene at atmospheric pressure. A slow reaction occurred over a 30-minute period which produced a polymer yield of 70%, based on monomer charged. The polymer was almost exclusively soluble in hydrocarbons. Only a trace of insoluble polymer was observed.

Example III

To a refluxing mixture of 50 cc. of methyl chloride and 20 cc. of 4-methyl-1-pentene was added 0.5 cc. of a 15 weight percent solution of monoethyl aluminum dichloride in n-heptane. A moderately fast reaction was observed which gave a polymer yield of 30%, based on monomer charged. About 40% of the polymer product was insoluble in hydrocarbons.

Example IV

The procedure of Example III was followed using various amounts of diethyl aluminum chloride. No reaction was obtained in any case.

The results of Examples I through IV are shown in the following table.

In order to establish the necessity of using a methyl halide solvent, the following runs were made. They should be compared against the methyl chloride solvent used in Example I.

Example V

To a refluxing mixture of 10 cc. of 4-methyl-1-pentene and 50 cc. of methyl bromide was added a small amount (ca. 0.2 g.) of $AlCl_3$ powder. An immediate, vigorous reaction was observed which produced a polymer yield of 100%, based on monomer charged. It was all insoluble in hydrocarbons.

Examples VI through XIV duplicated the procedure of Example V while using various other solvents. The results are tabulated in the following table.

TABLE II.—EFFECT OF SOLVENT ENVIRONMENT

| Example | Solvent | Polymer Type | Molecular Weight |
|---|---|---|---|
| I | Methyl chloride | Insoluble | >1,000,000 |
| V | Methyl bromide | ...do... | >1,000,000 |
| VI | Neopentane/20% MeCl | Soluble solid | 100,000 |
| VII | Neopentane/4% MeCl | ...do... | 75,000+ |
| VIII | Neopentane | Viscous semi-solid | 10,000 |
| IX | n-Pentane | ...do... | 10,000 |
| X | Ethyl chloride | Viscous oil | <5,000 |
| XI | Propyl chloride | ...do... | <5,000 |
| XII | Chloroform | ...do... | <5,000 |
| XIII | Carbon tetrachloride | ...do... | <5,000 |
| XIV | Carbon disulfide | Viscous semi-solid | 10,000 |

To illustrate the necessity of using a temperature above about −20° F., a number of runs were made at −50° F., −40° F., −30° F., −20° F., and −10° F. while using a methyl chloride solvent, and at +45° F. while using a methyl bromide solvent. The procedure was the same as in Example I except that at −20° F. and below, the pressure was reduced to obtain a boiling methyl chloride solvent. Also, a reaction time of only 5 minutes was allowed in each case.

At temperatures below −20° F., a negligible amount of polymer was formed. At above −20° F., measurable amounts were obtained. At −10° F., 100% conversion to the insoluble polymer was obtained with methyl chloride solvent. With methyl bromide at +45° F., 100% conversion to the insoluble polymer was obtained.

In order to show the deleterious effects of other tertiary carbon-containing compounds, the following runs were made using other compounds in admixture with the methyl chloride solvent. The amount of other compound is represented as weight percent based on the weight of methyl chloride used. The procedure of Example I was followed in each case.

TABLE III.—EFFECT OF OTHER COMPOUNDS

| Example | MeCl Containing— | Polymer | Molecular Weight | Remarks |
|---|---|---|---|---|
| I | | Insoluble | 1,000,000 | |
| XV | n-Heptane-2% | do | 1,000,000 | No adverse effect. |
| XVI | Isobutane-2% | Viscous semi-solid | 10,000 | Drastic reduction in M.W. |
| XVII | Isobutylene-5% | do | 10,000 | |
| XVIII | Isoprene-1% | Soluble solid | 75,000 | No insoluble polymer. |

Thus, it is seen that in order to optimize the production of the insoluble polymer, it is necessary that solid aluminum chloride catalyst be used with a methyl halide solvent; and that tertiary carbon-containing hydrocarbons other than the monomer be rigorously excluded from the reaction zone. A temperature in excess of $-20°$ F. is also shown to be necessary.

Having disclosed in detail the present invention, along with the preferred manner of practicing it, what is intended to be covered by Letters Patent should be limited not by the specific examples herein given but rather by the appended claims.

I claim:

1. An elastomeric, non-cold flowing cross-linked poly-4-methyl-1-pentene characterized by having a molecular weight in excess of 1,000,000 and being insoluble in hydrocarbon solvents, and having an infrared analysis as shown in FIGS. 1 and 1A, and a differential temperature analysis as shown for the cross-linked polymer in FIG. 2.

2. A method of selectively producing a predominantly hydrocarbon-insoluble elastomeric cross-linked poly-4-methyl-1-pentene which comprises
   contacting 4-methyl-1-pentene in a methyl halide solvent
   with a catalyst chosen from the group consisting of solid $AlCl_3$ and monoethyl aluminum chloride
   at a temperature within the range of $-20°$ F. to $+100°$ F.
   and in the substantial absence of competing tertiary carbon-containing compounds.

3. A method in accordance with claim 2 wherein the methyl halide is methyl chloride.

4. A method in accordance with claim 2 wherein the methyl halide is methyl bromide.

5. A method in accordance with claim 2 wherein the catalyst concentration is within the range of 0.00001 to 0.01 pound per pound of monomer.

6. A method in accordance with claim 2 wherein the catalyst is solid $AlCl_3$.

7. A method in accordance with claim 6 wherein the $AlCl_3$ is added to the reaction mixture in the form of a finely divided solid.

8. A method in accordance with claim 6 wherein the $AlCl_3$ is added to the reaction mixture as a saturated solution of $AlCl_3$ in methyl halide, and is precipitated in situ as a finely divided solid.

9. A method in accordance with claim 8 wherein the precipitation is accomplished by flashing off at least a portion of the methyl halide solvent.

10. A method in accordance with claim 8 wherein the precipitation is accomplished by introducing the catalyst solution into the monomer feed stream, whereby the catalyst is precipitated by the countersolvent action of 4-methyl-1-pentene.

11. A method of selectively producing a predominantly hydrocarbon-insoluble elastomeric cross-linked poly-4-methyl-1-pentene which comprises
   adding solid aluminum chloride powder to a refluxing methyl halide solvent and immediately thereafter adding 4-methyl-1-pentene
   in the substantial absence of competing tertiary carbon-containing hydrocarbons.

12. A method in accordance with claim 11 wherein the quantities are in the proportions of about 50 cc. of methyl halide, 0.15 g. of aluminum chloride, and 10 cc. of 4-methyl-1-pentene.

13. A method in accordance with claim 12 wherein the methyl halide is methyl chloride.

14. A method of selectively producing a predominantly hydrocarbon-insoluble elastomeric cross-linked poly-4-methyl-1-pentene which comprises
   adding to a refluxing mixture of 4-methyl-1-pentene and methyl halide,
   monoethyl aluminum dichloride catalyst
   in the substantial absence of competing tertiary carbon-containing compounds.

15. A method in accordance with claim 14 wherein the monoethyl aluminum dichloride is added as a 15 weight percent solution in n-heptane.

16. A method in accordance with claim 15 wherein the quantities are in the proportions of 50 cc. of methyl halide, 20 cc. of 4-methyl-1-pentene, and 0.5 cc. of 15 weight percent solution of monoethyl aluminum dichloride in n-heptane.

17. A method in accordance with claim 16 wherein the methyl halide is methyl chloride.

18. A method of selectively producing a predominantly hydrocarbon-insoluble elastomeric cross-linked poly-4-methyl-1-pentene which comprises
   contacting 4-methyl-1-pentene in a methyl halide solvent
   with a catalyst chosen from the group consisting of solid $AlCl_3$ and monoethyl aluminum chloride
   at a temperature within the range of $-20°$ F. to $+100°$ F., said temperature being the boiling point of the methyl halide solvent under the reaction conditions,
   and in the substantial absence of competing tertiary carbon-containing compounds.

19. A method in accordance with claim 18 wherein the methyl halide is methyl chloride.

20. A method in accordance with claim 18 wherein the methyl halide is methyl bromide.

21. A method in accordance with claim 18 wherein the catalyst concentration is within the range of 0.00001 to 0.01 lb./lb. of monomer.

22. A method in accordance with claim 18 wherein the catalyst is solid $AlCl_3$.

23. A method in accordance with claim 22 wherein the $AlCl_3$ is added to the reaction mixture in the form of a finely divided solid.

24. A method in accordance with claim 22 wherein the $AlCl_3$ is added to the reaction mixture as a saturated solution of $AlCl_3$ in methyl halide, and is precipitated in situ as a finely divided solid.

25. A method in accordance with claim 24 wherein the precipitation is accomplished by flashing off at least a portion of the methyl halide solvent.

26. A method in accordance with claim 24 wherein the precipitation is accomplished by introducing the catalyst solution into the monomer feed stream, whereby the catalyst is precipitated by the countersolvent action of 4-methyl-1-pentene.

27. A method of selectively producing a predominantly hydrocarbon-insoluble elastomeric cross-linked poly-4-methyl-1-pentene which comprises
   contacting 4-methyl-1-pentene in a methyl halide solvent
   with a monoethyl aluminum chloride catalyst at a temperature within the range of —20° F. to +100° F.,
and in the substantial absence of competing tertiary carbon-containing compounds.

28. A method in accordance with claim 27 wherein the methyl halide is methyl chloride.

29. A method in accordance with claim 27 wherein the methyl halide is methyl bromide.

30. A method in accordance with claim 27 wherein the catalyst concentration is within the range of 0.00001 to 0.01 lb./lb. of monomer.

No references cited.

JOSEPH L. SCHOFER, *Primary Examiner.*

M. B. KURTZMAN, *Assistant Examiner.*